(12) United States Patent
Zhan et al.

(10) Patent No.: US 8,651,456 B2
(45) Date of Patent: Feb. 18, 2014

(54) ELECTRONIC EXPANSION VALVE

(75) Inventors: Caiyi Zhan, Zhejiang Province (CN); Ze Yuan, Zhejiang Province (CN); Xianrang Wei, Zhejiang Province (CN)

(73) Assignee: Zhejiang Sanhua Co., Ltd., Xinchang County, Zhejiang Province (CN)

( * ) Notice: Subject to any disclaimer, the term of this patent is extended or adjusted under 35 U.S.C. 154(b) by 193 days.

(21) Appl. No.: 12/895,042

(22) Filed: Sep. 30, 2010

(65) Prior Publication Data

US 2011/0084224 A1  Apr. 14, 2011

(30) Foreign Application Priority Data

Oct. 9, 2009  (CN) .......................... 2009 1 0235360

(51) Int. Cl.
*F16K 31/44* (2006.01)
(52) U.S. Cl.
USPC ............................. 251/278; 251/276; 251/83
(58) Field of Classification Search
USPC ............... 251/77, 82, 83, 264, 274, 275, 276, 251/277, 278, 337, 272
See application file for complete search history.

(56) References Cited

U.S. PATENT DOCUMENTS

| | | | | |
|---|---|---|---|---|
| 1,681,044 A | * | 8/1928 | Malik | 251/77 |
| 2,105,490 A | * | 1/1938 | Noble | 184/55.2 |
| 3,815,873 A | * | 6/1974 | Hendrick | 251/337 |
| 5,715,481 A | * | 2/1998 | Ohmiya | 396/79 |
| 5,913,504 A | * | 6/1999 | Nishimura et al. | 251/62 |
| 5,971,013 A | * | 10/1999 | Beau et al. | 137/505.37 |
| 7,390,174 B2 | * | 6/2008 | Dinkel et al. | 417/549 |
| 8,297,586 B1 | * | 10/2012 | Thompson | 251/63.6 |

FOREIGN PATENT DOCUMENTS

| | | |
|---|---|---|
| CN | 100510580 C | 11/2007 |
| DE | 103398 | 7/1958 |
| GB | 504687 A | 4/1939 |
| JP | 3103614 | 4/1991 |
| JP | 2003329158 A | 11/2003 |
| JP | 2008175240 A | 7/2008 |
| JP | 2009168050 A | 7/2009 |
| JP | 2011021749 A | 2/2011 |
| WO | WO 2006064865 A1 | 6/2006 |

OTHER PUBLICATIONS

Translation of patent, JP 2003329158 A, Nov. 2003.*
European Search Report dated May 23, 2011 from corresponding European Application No. 10184249.
Office Action mailed Apr. 24, 2012 from corresponding Japanese Application No. 2010-107395 and English translation of same.

* cited by examiner

*Primary Examiner* — John K Fristoe, Jr.
*Assistant Examiner* — Angelisa Hicks
(74) *Attorney, Agent, or Firm* — Wolf, Greenfield & Sacks, P.C.

(57) ABSTRACT

The present invention provides an electronic expansion valve, comprising a leading screw, a valve needle and a valve needle sleeve. It further comprises: a washer provided in an annular groove, which is provided at the lower end of the leading screw in the circumferential direction, and a thickness of the washer is less than a width of the annular groove; the valve needle sleeve abuts against the upper surface of the washer and is fixedly connected with the valve needle; and a spring is provided between the washer and the valve needle.

20 Claims, 4 Drawing Sheets

ELECTRONIC EXPANSION VALVE

FIELD OF THE INVENTION

The embodiments of the present invention relate to valve field, in particular to an electronic expansion valve.

BACKGROUND

In the prior art electronic expansion valve, utilizing the operating principle of a step motor, a magnetic rotor is driven to rotate by a coil, and the rotation of the magnetic rotor is transferred into an up-down movement of a leading screw, which drives a valve needle connected thereto to move upward or downward, thus the flow of the electronic expansion valve can be controlled.

The prior art electronic expansion valve has a main structure including a jacket, a valve seat, a magnetic rotor, a nut, a leading screw, a valve needle and a valve needle sleeve, etc. The leading screw is mated with a folding edge on the upper end of the valve needle sleeve by a fixing plate provided on the leading screw, so that the leading screw is movably connected with the valve needle sleeve; and the valve needle sleeve is fixedly provided with a valve needle at its lower end, thus a movable connection is achieved between the leading screw and the valve needle. The valve needle sleeve is provided with a spring therein, which has its one end abut against the fixed plate and the other abut on the valve needle. Thus, a certain pressure is established between the leading screw and the valve needle by the spring. When the valve needle is driven by the leading screw to move downward to close a valve port on the valve seat, the spring will be compressed by the leading screw after the valve needle contacts with the valve port, so that a certain pressure is established between the valve needle and the valve port, preventing the valve needle from being opened by the impact of liquids.

During the implementation of the present invention, the inventor found that at least the following problems are present in the prior art: in the prior art, due to the fact that the pressure of the spring is large, there still exists the pressure of the spring between the leading screw and the valve needle after the valve needle is driven by the leading screw to leave the port. Because of the large spring pressure between the leading screw and the valve needle, when the valve needle having left the valve port deviates relative to the leading screw, the valve needle thus deviated cannot easily be adjusted and restored under the action of the spring pressure. Moreover, when the valve port contacts with the valve needle, the friction surfaces between the leading screw and the washer and between the valve needle sleeve and the washer are large, and the arm of the friction force is also large, so that the leading screw can only rotate relative to the valve needle by overcoming a relatively large friction resistance, leading to difficulty in the relative rotation between the valve needle and the leading screw. Therefore, the prior art electronic expansion valve has poor reliability.

SUMMARY OF THE INVENTION

The embodiments of the present invention provide an electronic expansion valve to improve the reliability of the electronic expansion valve.

The embodiments of the present invention provides an electronic expansion valve including a leading screw, a valve needle and a valve needle sleeve, and it further includes:

a washer provided in an annular groove, which is provided at the lower end of the leading screw in the circumferential direction, and a thickness of the washer is less than a width of the annular groove; the valve needle sleeve abuts against the upper surface of the washer and is fixedly connected with the valve needle; and a spring is provided between the washer and the valve needle.

In the electronic expansion valve according to embodiments of the present invention, by arranging the washer into the annular groove positioned at the lower end of the leading screw in the circumferential direction, with the thickness of the washer being less than the width of the annular groove, and by arranging the spring between the valve needle and the washer, the washer is enabled to rotate around the annular groove in the circumferential direction, and move up and down within the annular groove. After the valve needle leaves the valve port, the washer is pressed onto the valve needle sleeve under the pressure of the spring, and this pressure is only applied to the valve needle sleeve and valve needle 6, while the leading screw is free from it. Thus, the valve needle can be easily adjusted and restored when being displaced, and the valve needle and the leading screw can move relative to each other flexibly. Moreover, when the valve port contacts with the valve needle, the friction surfaces between the leading screw and the washer and between the valve needle sleeve and the washer are small, and the arm of the friction force is also small, so that the leading screw can rotate relative to the valve needle by overcoming a relatively small moment of frictional resistance, which can reduce the starting voltage for the product effectively. Thus the reliability of the electronic expansion valve is improved.

BRIEF DESCRIPTION OF THE DRAWINGS

For illustrating the technical solution in the embodiments of the present invention or in the prior art more clearly, brief descriptions will be hereinafter given to the accompanied drawings that will be used in the description of the embodiments of the present invention or of the prior art. For those skilled in art, other drawings can be obtained according to the accompanied drawings without creative work.

DETAILED DESCRIPTION OF THE INVENTION

To clarify the objects, technical solutions and advantages of the embodiments of the present invention, descriptions will be given clearly and sufficiently hereinafter to the technical solutions in the embodiments of the present invention with reference to the accompanied drawings. Apparently, the embodiments described are only a part the invention, not all of it. All other embodiments, which are obtained by those skilled in the art based on the embodiments in the present invention without any inventive effort, are intended to be within the scope of protection of the invention.

Figure 1:
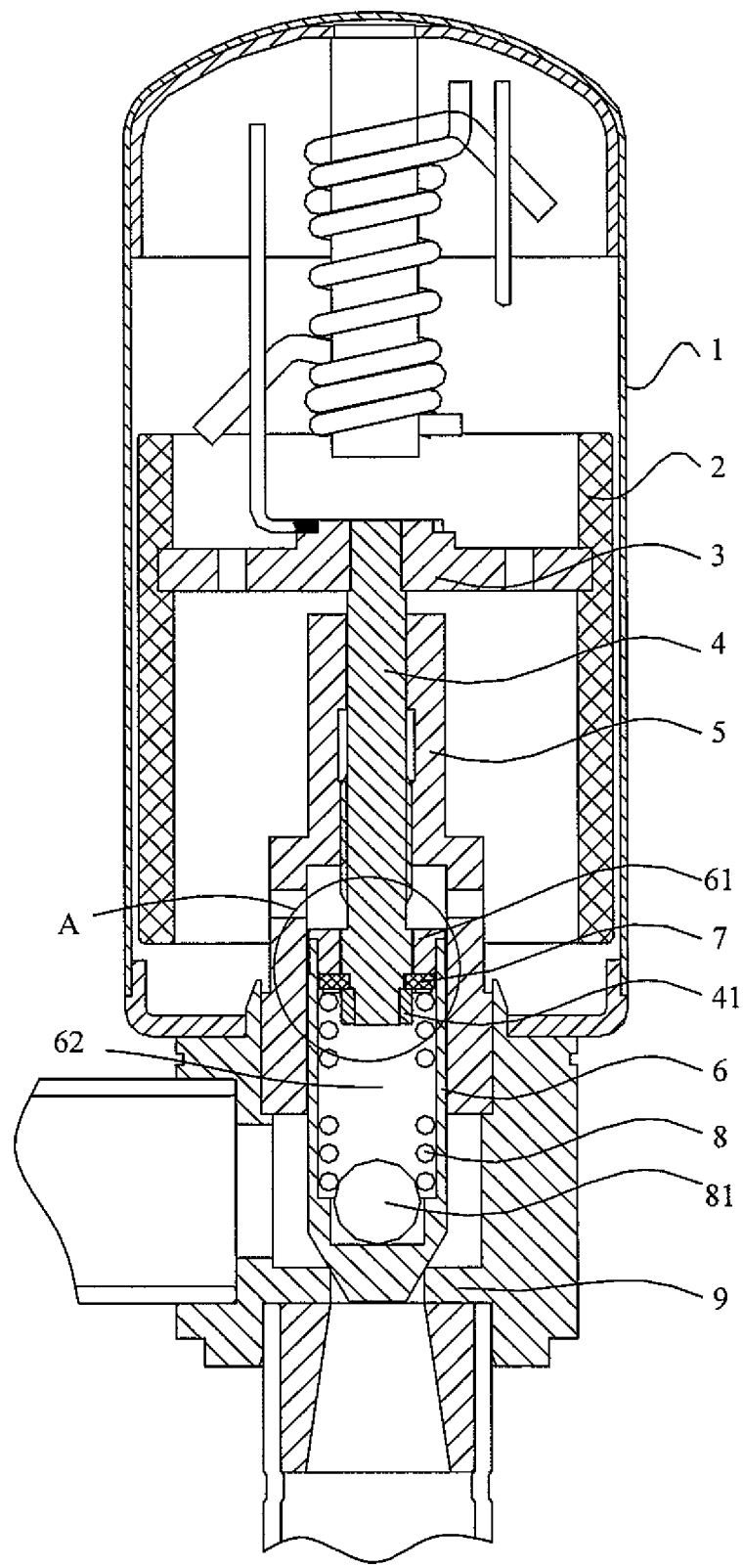
FIG. 1 is a schematic view showing the structure of a first embodiment of an electronic expansion valve according to the present invention.
Figure 2:
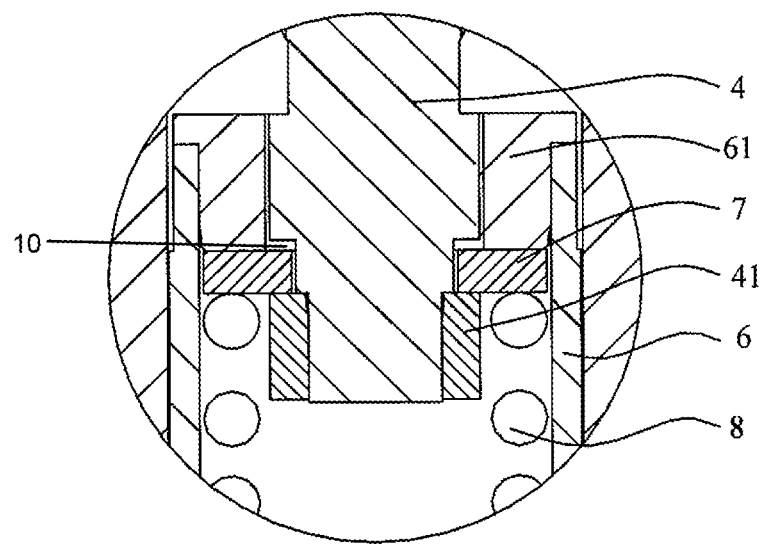
FIG. 2 is a schematic view showing the structure of region A in FIG. 1.
Figure 3:
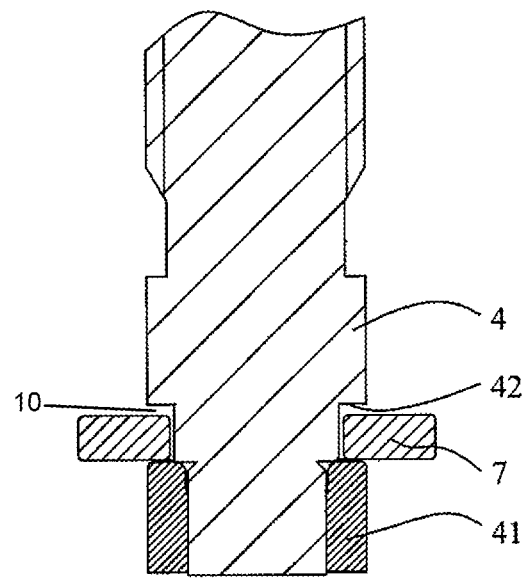
FIG. 3 is a schematic view showing the leading screw and the washer of the first embodiment of the electronic expansion valve in assembly according to the present invention.

FIG. 1 is a schematic view showing the structure of a first embodiment of an electronic expansion valve according to the present invention, FIG. 2 is a schematic view showing the structure of region A in FIG. 1, and FIG. 3 is a schematic view showing the leading screw and the washer of the first embodiment of the electronic expansion valve in assembly according to the present invention. As shown in FIGS. 1, 2 and 3, an electronic expansion valve of this embodiment includes a leading screw 4, a valve needle 6 and a valve needle sleeve 61. The main structure of the electronic expansion valve of this embodiment further includes: a jacket 1, a valve seat 9 fixedly connected with the jacket 1, a magnetic rotor 2 that is rotatable within the jacket 1, a nut 5 mated with screws of the leading screw 4 and other components included in an electronic expansion valve, the description of which is omitted herein.

In order to free the leading screw 4 in the electronic expansion valve from the action of the spring force when the valve needle 6 leaves a valve port, the electronic expansion valve of this embodiment is implemented as follows.

The electronic expansion valve of this embodiment further includes a washer 7.

The washer 7 is moveably arranged in an annular groove provided on the lower end of the leading screw 4 in the circumferential direction, the thickness of the washer 7 being less than the width of the annular groove. In particular, the annular groove in the electronic expansion valve of this embodiment may be implemented in the following two manners:

In the first manner, as shown in Figs. 2 and 3, a step surface 42 may be provided on the lower end of the leading screw 4 of the electronic expansion valve of this embodiment, a leading screw sleeve 41 is fixedly provided on the leading screw 4 below the step surface 42, so that an annular groove 10 is formed between an upper end surface of the leading screw sleeve 41 and the step surface 42. The washer 7 has a circular structure and its through hole mates with the annular groove 10 through clearance fit. Particularly, in the first manner, the washer 7 of the electronic expansion valve of this embodiment has a circular structure; the through hole of the washer 7 is socketed on the lower end of the leading screw 4 so that the washer 7 is positioned below the step surface 42; after that, the leading screw sleeve 41 is fixedly provided on the leading screw 4 below the step surface 42, so that the washer 7 is positioned in a space between the leading screw sleeve 41 and the step surface 42, which space formed between the leading screw sleeve 41 and the step surface 42 forms the annular groove 10.

Figure 5:
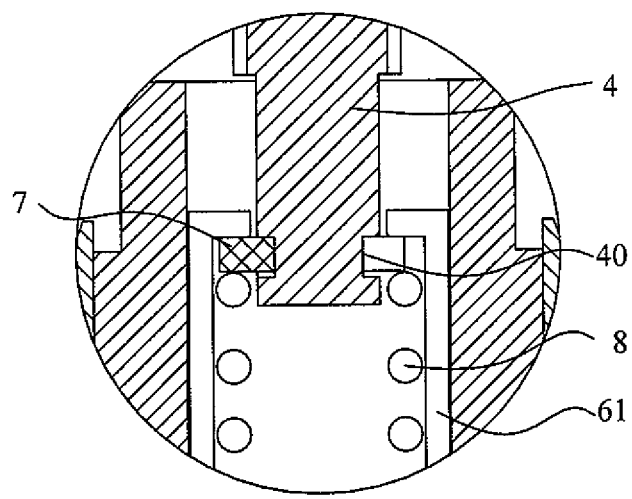
FIG. 5 is a schematic view showing the structure of region B in FIG. 4.
Figure 6:
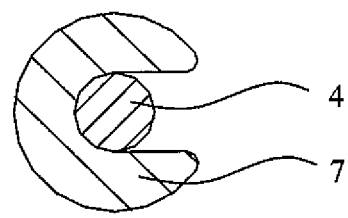
FIG. 6 is an axial section view of the leading screw and the washer of the second embodiment of the electronic expansion valve according to the present invention.

In the second manner, as shown in FIGS. 5 and 6, an annular groove 40 is arranged on a side surface of the lower end of the leading screw 4 in the electronic expansion valve of this embodiment; a U-shaped opening 40 of a washer 7 having a U-shaped structure is inserted into the annular groove 40. Particularly, the washer 7 in the second manner of the electronic expansion valve of this embodiment has a U-shaped structure, so that the U-shaped opening of the washer 7 can be inserted directly into the annular groove 40 provided on the leading screw 4.

In both manners, the width of the annular groove should be larger than the thickness of the washer 7, so that the washer 7 can move up and down within the annular groove, and can also rotate freely in the annular groove around the leading screw 4.

The valve needle sleeve 61 abuts on the upper surface of the washer 7 and is fixedly connected with the valve needle 6.

Particularly, the washer 7 in the electronic expansion valve of this embodiment is used for floatingly connecting the valve needle 6 and the leading screw 4 together, so that the valve needle 6 rotates freely relative to the leading screw 4 in the circumferential direction, and can move up and down in the axial direction.

The valve needle 6 and valve needle sleeve 61 in the electronic expansion valve of this embodiment may have two structural forms as follows.

In the first structural form, as shown in FIG. 1, the valve needle 6 in the electronic expansion valve of this embodiment may be provided with an inner hole 62, into which the valve needle sleeve 61 is inserted so that the valve needle sleeve 61 is fixedly connected with the valve needle 6; the inner hole 62 of the valve needle 6 is provided with a spring 8 therein, which has a lower end contacting with the bottom of the inner hole 62 of the valve needle 6. Particularly, the valve needle 6 in the first structural form of the electronic expansion valve of this embodiment is provided with an inner hole 62, inside which a spring 8 is provided, and the outer wall of the valve needle sleeve 61 is inserted into the inner hole 62 to realize a fixed connection with the valve needle 6; wherein, the washer 7 abutting against the valve needle sleeve 61 is also positioned within the inner hole 62, so that a float connection between the valve needle 6 and the leading screw 4 is obtained by the washer 7 and the valve needle sleeve 61.

Figure 4:
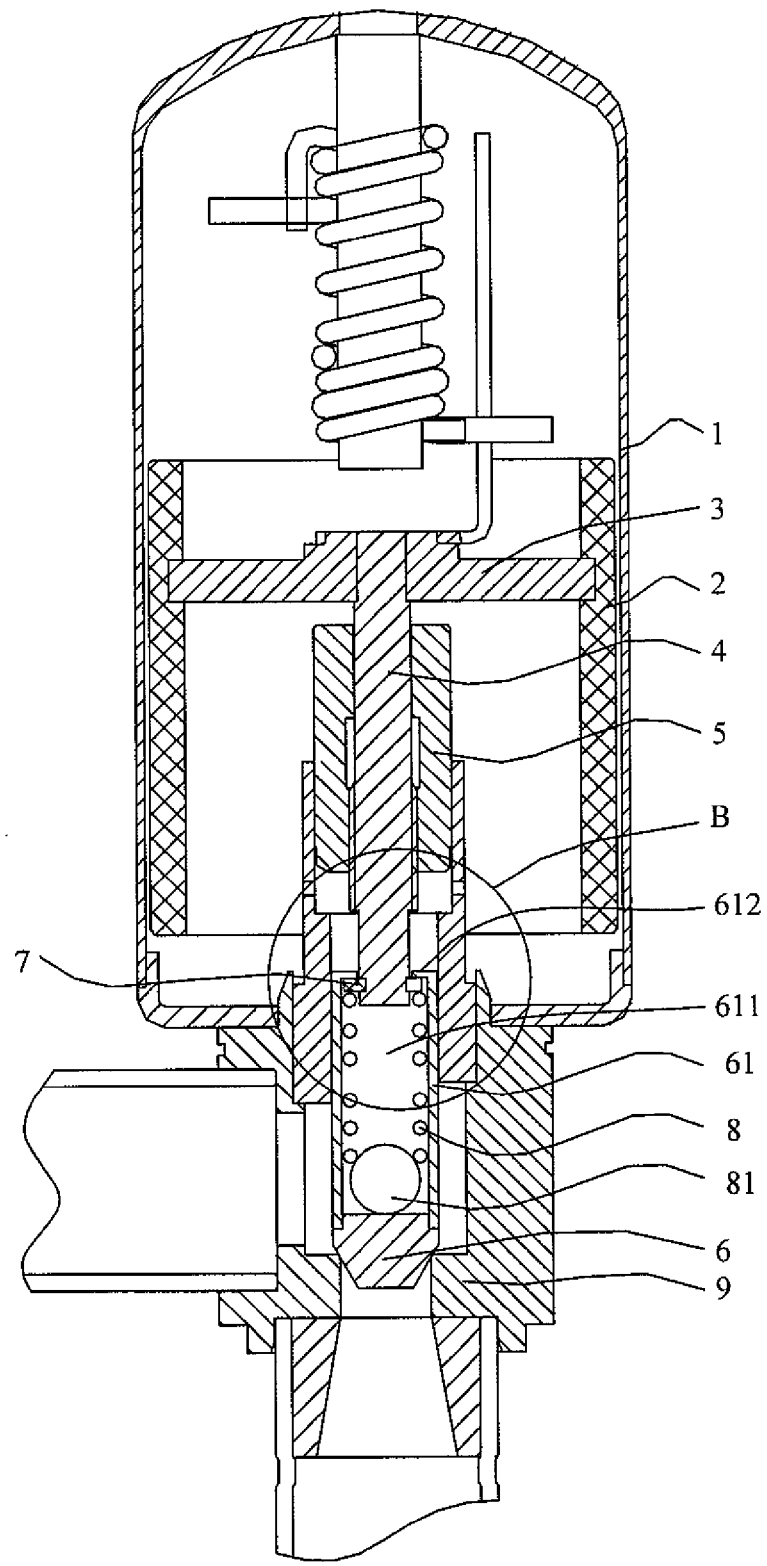
FIG. 4 is a schematic view showing the structure of a second embodiment of an electronic expansion valve according to the present invention.

In the second structural form, as shown in FIG. 4, the valve needle sleeve 61 in the electronic expansion valve of this embodiment may have a cylinder structure with a through hole 611, the valve needle sleeve 61 has an inward-folding edge at the top end which abuts against the upper surface of the washer 7; the valve needle 6 is fixedly provided at the lower end of the valve needle sleeve 61; and the through hole 611 of the valve needle sleeve 61 is provided with a spring 8 therein. Particularly, the valve needle sleeve 61 in the second structural form of the electronic expansion valve of this embodiment is a cylinder structure with a through hole 611, and the valve needle sleeve 61 abuts against the upper surface of the washer 7 through the inward-folding edge 612 provided on the top; the through hole 611 of the valve needle sleeve 61 is provided with the spring 8 therein, and the valve needle 6 is fixedly provided at the lower end of the valve needle sleeve 61; wherein, the valve needle sleeve 61 contains the washer 7 and the spring 8 in its through hole 611, so that a float connection between the valve needle 6 and the leading screw 4 is obtained by the washer 7 and the valve needle sleeve 61.

The spring 8 is arranged between the washer 7 and the valve needle 6. Particularly, the upper end of the spring 8 is contacted with the lower surface of the washer 7, and the lower end of the spring 8 is contacted with the valve needle 6. By providing the spring 8 between the washer 7 and the valve needle 6, the pressure generated by the spring 8 is delivered to the leading screw 4 or the valve needle sleeve 61 through the washer 7.

The operating process of an electronic expansion valve according to the present invention will be described with reference to the technical solutions described above.

In the electronic expansion valve of this embodiment, the spring 8 is arranged between the washer 7 and the valve needle 6, and the pressure generated by the spring 8 is delivered to the leading screw 4 or the valve needle sleeve 61 through the washer 7. When the leading screw 4 drives the valve needle 6 to move downward so that the valve needle 6 is closely contacted with the valve port on the valve seat 9, the washer 7 arranged in the annular groove is brought into contact with the upper annular inner end surface of the annular groove, and the pressure of spring 8 is delivered to the leading screw 4 through the washer 7, so that the pressure of the spring 8 is applied between the leading screw 4 and the valve needle 6. At this point, because the contact area between the washer 7 and the annular groove on the leading screw 4 is small and the contact point is adjacent to the rotating central axis, the moment of frictional resistance between the washer 7 and the leading screw 4 is quite small, which may reduce the starting voltage for the product efficiently. When the leading screw 4 drives the valve needle 6 to move upward so that the valve needle 6 is away from the valve port on the valve seat 9, due to the fact that the thickness of the washer 7 is less than the width of the annular groove, the lower surface of the washer 7 is brought into contact with the upper annular inner end surface of the annular groove under the effect of the weight of the valve needle 6 and the valve needle sleeve 61 or of the air pressure; and the upper surface of the washer 7 is brought into close contact with the valve needle sleeve 61 under the pressure of the spring 8, that is, the pressure of the spring only acts between the valve needle 6 and the valve needle sleeve 61; at this point, the leading screw 4 is free from the pressure of the spring 8. Therefore, after the valve needle 6 of the electronic expansion valve of this embodiment leaves the valve port on the valve seat 9, the pressure of the spring 8 would not be applied on the leading screw 4, so that the valve needle 6 can rotate freely relative to the leading screw 4, and move up and down freely within the annular groove.

In the electronic expansion valve according to embodiments of the present invention, by arranging the washer into the annular groove positioned at the lower end of the leading screw in the circumferential direction, with the thickness of the washer being less than the width of the annular groove, and by arranging the spring between the valve needle and the washer, the washer is enabled to rotate around the annular groove in the circumferential direction, and move up and down within the annular groove. After the valve needle leaves the valve port, the washer is pressed onto the valve needle sleeve under the pressure of the spring, and this pressure is only applied to the valve needle sleeve and valve needle 6, while the leading screw is free from it. Thus, the valve needle can be easily adjusted and restored when being displaced, and the valve needle and the leading screw can move relative to each other flexibly. Moreover, when the valve port contacts with the valve needle, the friction surfaces between the leading screw and the washer and between the valve needle sleeve and the washer are small, and the arm of the friction force is also small, so that the leading screw can rotate relative to the valve needle by overcoming a relatively small moment of frictional resistance, which can reduce the starting voltage for the product effectively. Thus the reliability of the electronic expansion valve is improved.

Based on the technical solution described above, optionally, in order to improve the flexibility of the rotation of the spring 8 relative to the valve needle 6, it is possible to reduce the friction force between the spring 8 and the valve needle 6.

As shown in FIG. 1, in the first structural form of the electronic expansion valve of this embodiment, the inner hole 62 of the valve needle 6 is provided with a rigid ball 81 therein, which is positioned between the bottom of the inner hole 62 of the valve needle 6 and the spring 8. As shown in FIG. 4, in the second structural form of the electronic expansion valve of this embodiment, the through hole 611 of the valve needle sleeve 61 is provided with a rigid ball 81 therein, which is positioned between the valve needle 6 and the spring 8. Particularly, when the spring 8 rotates relative to the valve needle 6, the spring 8 contacts with the spherical surface of the rigid ball 81 instead of the valve needle 6, and the rigid ball 81 can reduce the friction force generated by the relative rotation between the spring 8 and the valve needle 6 effectively.

In the embodiment, the electronic expansion valve provides a rigid ball between the valve needle and the spring and can reduce the friction force generated by the relative rotation between the spring and the valve needle effectively by using the rigid ball. Thus the valve needle can rotate more flexibly, improving the reliability of the electronic expansion valve.

In the end, it should be noted that the embodiments above are only used for the illustration of the technical solution of the present invention and are not intended to limit the present invention. Although a detailed description is given to the present invention with reference to the embodiments above, it should be appreciated by those skilled in art that it is still possible to make modification to those technical solutions specified in these embodiments, or make equivalent replacement to some of the technical features therein, and such modification or replacement would not make those relative technical solutions to depart form the spirit and scope of the present invention.

The invention claimed is:

1. An electronic expansion valve, including a valve needle and a valve needle sleeve fixedly connected with the valve needle, the electronic expansion valve comprising:
    a leading screw including an annular groove provided at a lower end of the leading screw and extending in a circumferential direction;
    a washer movably provided in the annular groove, wherein a thickness of the washer is less than a height of the annular groove, and wherein the valve needle sleeve abuts against an upper surface of the washer; and
    a spring contacting the washer and the valve needle.

2. The electronic expansion valve according to claim 1, wherein a step surface is provided at the lower end of the leading screw, a screw sleeve is fixedly provided on the leading screw below the step surface, and the annular groove is formed between the upper end surface of the screw sleeve and the step surface; and the washer is a circular structure and has a through hole which mates with the annular groove through clearance fit.

3. The electronic expansion valve according to claim 1, wherein the annular groove is provided on a side surface of the lower end of the leading screw; the washer has a U-shaped structure, and a U-shaped opening of the washer is inserted into the annular groove.

4. The electronic expansion valve according to claim 1, wherein the valve needle is provided with an inner hole, into which the valve needle sleeve is inserted, so that the valve needle sleeve is fixedly connected with the valve needle; the spring is arranged in the inner hole of the valve needle, and a lower end of the spring is contacted with a bottom of the inner hole of the valve needle.

5. The electronic expansion valve according to claim 1, wherein the valve needle sleeve has a cylinder structure with a through hole, the valve needle sleeve has an inward-folding edge at a top end which abuts against the upper surface of the washer; the valve needle is fixedly provided at a lower end of the valve needle sleeve; and the spring is arranged in the through hole of the valve needle sleeve.

6. The electronic expansion valve according to claim 4, wherein a rigid ball is provided in the inner hole of the valve needle, and the rigid ball is positioned between the bottom of the inner hole of the valve needle and the spring.

7. The electronic expansion valve according to claim 5, wherein a rigid ball is provided in the through hole of the valve needle sleeve, and the rigid ball is positioned between the valve needle and the spring.

8. An electronic expansion valve including a valve needle and a valve needle sleeve fixedly connected with the valve needle, the electronic expansion valve comprising:
   a leading screw including a step surface provided at a lower end of the leading screw;
   a screw sleeve affixed to the leading screw below the step surface, wherein an annular groove extending in a circumferential direction is formed between an upper surface of the screw sleeve and the step surface;
   a washer movably provided in the annular groove, wherein a thickness of the washer is less than a height of the annular groove, and wherein the valve needle sleeve abuts against an upper surface of the washer.

9. The electronic expansion valve according to claim 8, wherein the washer is a circular structure and has a through hole which mates with the annular groove through a clearance fit.

10. The electronic expansion valve according to claim 8, further comprising a spring provided between the washer and the valve needle.

11. The electronic expansion valve according to claim 10, wherein the spring contacts the washer and the valve needle.

12. The electronic expansion valve according to claim 8, wherein the valve needle is provided with an inner hole, into which the valve needle sleeve is inserted to fixedly connect the valve needle sleeve with the valve needle.

13. The electronic expansion valve according to claim 12, further comprising a spring provided between the washer and the valve needle, and wherein the spring is arranged in the inner hole of the valve needle, and a lower end of the spring contacts a bottom of the inner hole of the valve needle.

14. An electronic expansion valve including a valve needle and a valve needle sleeve fixedly connected with the valve needle, the electronic expansion valve comprising:
   a leading screw including an annular groove provided on a side surface of a lower end of the leading screw and extending in a circumferential direction, wherein the annular groove includes an upper surface, a lower surface, and a side surface;
   a washer movably provided in the annular groove, wherein a thickness of the washer is less than a height of the annular groove, and wherein the valve needle sleeve abuts against an upper surface of the washer; and
   the washer has a U-shaped structure, and a U-shaped opening of the washer is inserted into the annular groove.

15. The electronic expansion valve according to claim 14, further comprising a spring provided between the washer and the valve needle.

16. The electronic expansion valve according to claim 15, wherein the spring contacts the washer and the valve needle.

17. The electronic expansion valve according to claim 14, wherein the valve needle sleeve comprises a cylinder structure with a through hole.

18. The electronic expansion valve according to claim 17, wherein the valve needle sleeve comprises an inward-folding edge at a top end which abuts against the upper surface of the washer.

19. The electronic expansion valve according to claim 18, wherein the valve needle is fixedly provided at a lower end of the valve needle sleeve.

20. The electronic expansion valve according to claim 19, further comprising a spring provided between the washer and the valve needle, and wherein the spring is arranged in the through hole of the valve needle sleeve.

* * * * *